United States Patent [19]

Suzuki et al.

[11] Patent Number: 4,845,900
[45] Date of Patent: Jul. 11, 1989

[54] METHOD AND APPARATUS FOR GRINDING STRAIGHT-EDGED CUTTING TOOLS TO A FINE FINISH

[75] Inventors: Hiromi Suzuki, Oobu; Eiiti Suzuki, Toyoake; Isao Mizuno, Nagoya, all of Japan

[73] Assignee: Kabushiki Kaisha Taihei Seisakusho, Aichi, Japan

[21] Appl. No.: 83,732

[22] Filed: Aug. 10, 1987

[30] Foreign Application Priority Data

Dec. 25, 1986 [JP] Japan .................................. 61-313134
Dec. 27, 1986 [JP] Japan .................................. 61-315747

[51] Int. Cl.$^4$ .............................................. B24B 3/38
[52] U.S. Cl. ...................................... 51/285; 51/56 R; 51/165.9; 51/111 R
[58] Field of Search ............. 51/56 R, 109 BS, 111 R, 51/125, 165.9, 285 R, 283 E, 327

[56] References Cited

U.S. PATENT DOCUMENTS

| | | | |
|---|---|---|---|
| 1,199,672 | 9/1916 | Dick ..................................... | 51/56 R |
| 1,980,872 | 11/1934 | Moul ................................... | 51/56 R |
| 2,539,107 | 1/1951 | Sectish ................................. | 51/56 R |
| 2,578,789 | 12/1951 | Donnelly ........................... | 51/217 R |
| 4,313,283 | 2/1982 | Smith .................................. | 51/56 R |
| 4,532,735 | 8/1985 | Dahlgren et al. ................. | 51/56 R |

FOREIGN PATENT DOCUMENTS 2753389 5/1979 Fed. Rep. of Germany ... 51/109 BS
2224459 7/1979 Fed. Rep. of Germany ..... 51/165.9

Primary Examiner—Frederick R. Schmidt
Assistant Examiner—Robert A. Rose
Attorney, Agent, or Firm—Ladas & Parry

[57] ABSTRACT

For superfinishing an elongate cutting tool which has been rough-ground by a separate machine, a pair of grinding wheels are first urged against the opposite sides of the work via respective fluid-actuated cylinders, until sufficient fluid energy builds up in the cylinders to enable the grinding wheels to grind the work to any desired depths. Being mounted on a common carriage, the grinding wheels are then reciprocated longitudinally of the work while being held in constant rotation and being urged against the work under the fluid pressure. On reaching either end of the work during such reciprocation, the grinding wheels are relieved of the fluid pressure until they restart traveling toward the other end, in order to avoid overgrinding the opposite ends of the work. The reciprocation of the grinding wheels is terminated when the opposite sides of the work are ground to required degrees. The complete operation can be automated. Preferably, one of the grinding wheels is angularly displaceable relative to the work about an axis parallel to the longitudinal direction of the work.

6 Claims, 17 Drawing Sheets

|   | ANGLE | NO. OF RECIPROCATIONS | | |
|---|---|---|---|---|
|   |   | PRESET | CURRENTLY | REMAINDER |
| 1 |  |  |  | 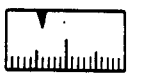 |
| 2 | 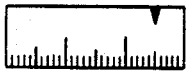 | 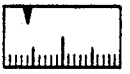 |  |  |
FIG. 14
|   | ANGLE | NO. OF RECIPROCATIONS | | |
|---|---|---|---|---|
|   |   | PRESET | CURRENTLY | REMAINDER |
| 1 | 28.0 | 10 | 4 | 6 |
| 2 | 25.0 | 4 | 0 | 4 |
FIG. 15

METHOD AND APPARATUS FOR GRINDING STRAIGHT-EDGED CUTTING TOOLS TO A FINE FINISH

BACKGROUND OF THE INVENTION

This invention relates generally to the grinding or sharpening of cutting tools, particularly of relatively elongate, straight-edged cutting tools such as knives for use on veneer lathes and veneer slicers. More particularly, the invention pertains to a method of, and apparatus for, finish-grinding the edges of such cutting tools to an extent known as superfinishing in the art, after they have been rough-ground by conventional machines.

The superfinishing of the cutting tools of the class under consideration has long relied upon the dexterity of veteran workers using flat abrasive stones. Being based on empirical knowledge, such hand finishing requires utmost skill which is attainable only after years and years of practice. The operation itself, moreover, is very timeconsuming and uneconomical.

Recently, machine finishing has been introduced which employs a mechanical spring for pressing a superfine grinding wheel against the work. Preparatory to grinding, the spring is stressed to an extent necessary to enable the wheel to grind the work to a desired depth. The use of a spring is objectionable, however, because it does not necessarily urge the grinding wheel against the work under constant pressure; rather, the spring tends to impart vibrations to the grinding wheel, resulting in the fine skipping of the wheel over the work as the wheel travels longitudinally of the work. The spring-biased grinding wheel may thus fail to grind the work to a desired degree of superfine finish and, in the worst case, may even destroy its cutting edge.

Finish grinding has long been thought of as an indispensible, but somewhat minor, supplement to rough grinding. It has therefore been practiced to use a rough-grinding machine for finish grinding, merely by changing the grinding wheels to finer ones. This practice is objectionable not only because of the poor finish obtained, but also because the grinding wheel or wheels are set at fixed angles with respect to the work. Such fixed-angle wheels do not lend themselves to use for double-, triple- or other multiple-taper grinding of the work for the provision of more durable cutting edges. For these reasons the advent of exclusive superfinishing machines has long been awaited in the woodworking industry.

SUMMARY OF THE INVENTION

The present invention aims at the provision of a novel method of, and apparatus for, finish-grinding relatively long, straight-edged cutting tools to an unvarying degree of sharpness throughout its longitudinal dimension and without the likelihood of impairing the cutting edge in so doing.

Basically, in accordance with the invention, a fluid-actuated cylinder is employed for urging a grinding wheel endwise against the work. The method of this invention dictates, first of all, to press the grinding wheel against the work via the fluid-actuated cylinder until sufficient fluid pressure builds up in the cylinder to enable the grinding wheel to grind the work to any required depth. Then, with the grinding wheel held in rotation and urged against the work under the fluid energy, the grinding wheel is reciprocated longitudinally of the work until the work is ground to a desired depth. During such reciprocation the grinding wheel is relieved of the fluid energy each time it reaches either end of the work, until it restarts traveling toward the other end of the work. As desired, the opposite sides of the work may be ground simultaneously by a pair of grinding wheels which are urged against the work by respective fluid-actuated cylinders.

No matter how long the work may be, the grinding wheel or wheels under fluid pressure can grind one or both sides of the work to a constant depth or depths throughout its length, even in the presence of possible surface undulations or other imperfections of the work. As an additional advantage, since the grinding wheel or wheels are temporarily relieved of the fluid pressure at both ends of the work, the overgrinding of the work ends is avoided during the periods of standstill for a change in direction.

The invention also provides apparatus for carrying out the above summarized method. Typically, and not necessarily, the apparatus comprises a pair of grinder units of like construction each comprising a grinding wheel, a fluid-actuated cylinder, wheel drive means, etc. Both mounted on a common grinder carriage for reciprocation longitudinally of the work, the pair of grinder units concurrently grind the opposite sides of the work. The grinding wheels of the two grinder units have such an offset therebetween in the longitudinal direction of the work that they do not interfere with each other during grinding.

Preferably, at least one of the grinder units is pivoted on the grinder carriage for angular adjustment about an axis parallel to the longitudinal direction of the work. The pivotal grinder unit makes it possible to grind one side of the cutting edge of the work at any desired angle, or at a series of two, three or more different angles for the double-, triple- or multiple-taper grinding of the work.

An additional grinding mode is possible with the pivotal grinder unit. For superfinishing a rough-ground cutting tool having its edge defined by a sloping side and nonsloping side with an acute angle therebetween, the pivoted grinder unit may first grind the sloping side of the work to a predetermined depth at a greater acute angle with respect to its nonsloping side than the initial acute angle between the sloping and nonsloping sides of the work. The sloping side of the work may then be ground to progressively smaller depths at progressively smaller angles with respect to the nonsloping side. So ground, the sloping side of the cutting tool, which has initially been planar, can be convexed in cross section. The cutting edge of the tool can thus be rendered materially more durable than if its sloping side is ground flat, without the sacrifice of its sharpness.

The operation of the apparatus, inclusive of both single- and multiple-taper grinding, is easy to automate, as also disclosed herein as an additional feature of the invention. The automatic control of the apparatus requires the provision of a grinding depth detector for producing a depth signal indicative, in real time, of the depth to which the work has been ground, as well as an angle detector for producing an angle signal indicative of the angle of the grinding wheel with respect to the work. These depth and angle signals are input to control circuit means. Also input to the control circuit means are data representative of a desired grinding angle or angles and of a desired depth to which the work is to be ground at the desired angle or each desired angle. Such data representative of several different desired grinding angles, or of several different desired series of grinding angles, and of associated desired grinding depths may be previously introduced into the control circuit means. Further, as required, an additional desired grinding angle or series of grinding angles and an additional desired grinding depth or series of grinding depths may be manually input to the control circuit means preparatory to the commencement of each grinding job.

Supplied with all such data, the control circuit means will automatically control the operation of the apparatus for either single- or multiple-taper grinding. The actual grinding depth may be determined either by counting the reciprocations or strokes of the grinder carriage traveling longitudinally of the work, by detecting the axial displacement of the grinding wheel or wheels toward the work, or by shooting the work with a video sensor.

The above and other features and advantages of this invention and the manner of realizing them will become more apparent, and the invention itself will best be understood, from a study of the following description and appended claims, with reference had to the attached drawings showing some preferable embodiments of the invention.

BRIEF DESCRIPTION OF THE DRAWINGS

FIG. 14 is a fragmentary illustration of an analog display panel for visually indicating the progress of the automatic or semiautomatic multiple-taper grinding operation of the apparatus;

FIG. 15 is a similar illustration of a digital display panel alternative to the analog display panel of FIG. 14;

DETAILED DESCRIPTION

Mechanical Construction

Figure 1:
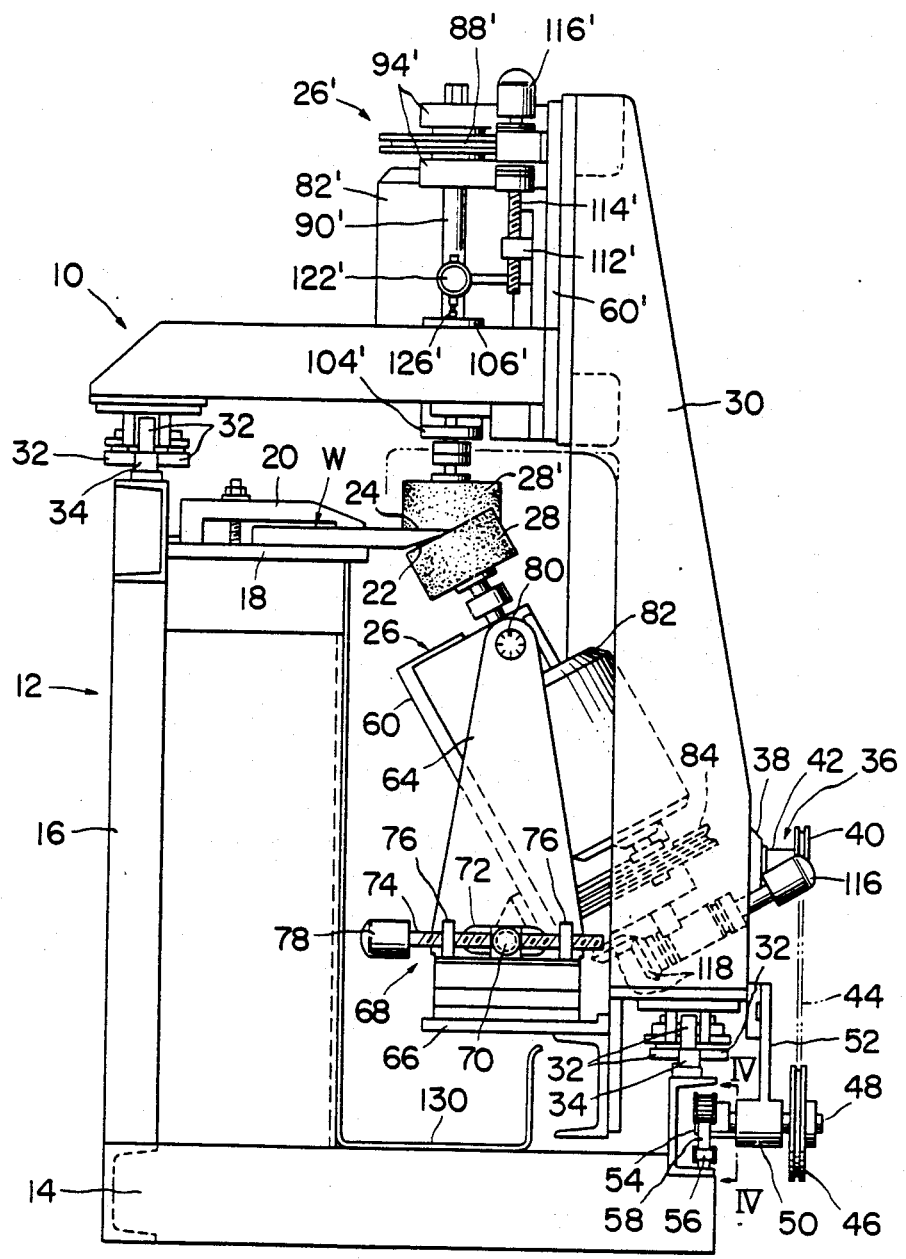
FIG. 1 is a side elevation of the apparatus constructed in accordance with the novel principles of this invention, the apparatus being shown in the act of simultaneously grinding the opposite sides of a straight-edged cutting tool.
Figure 2:
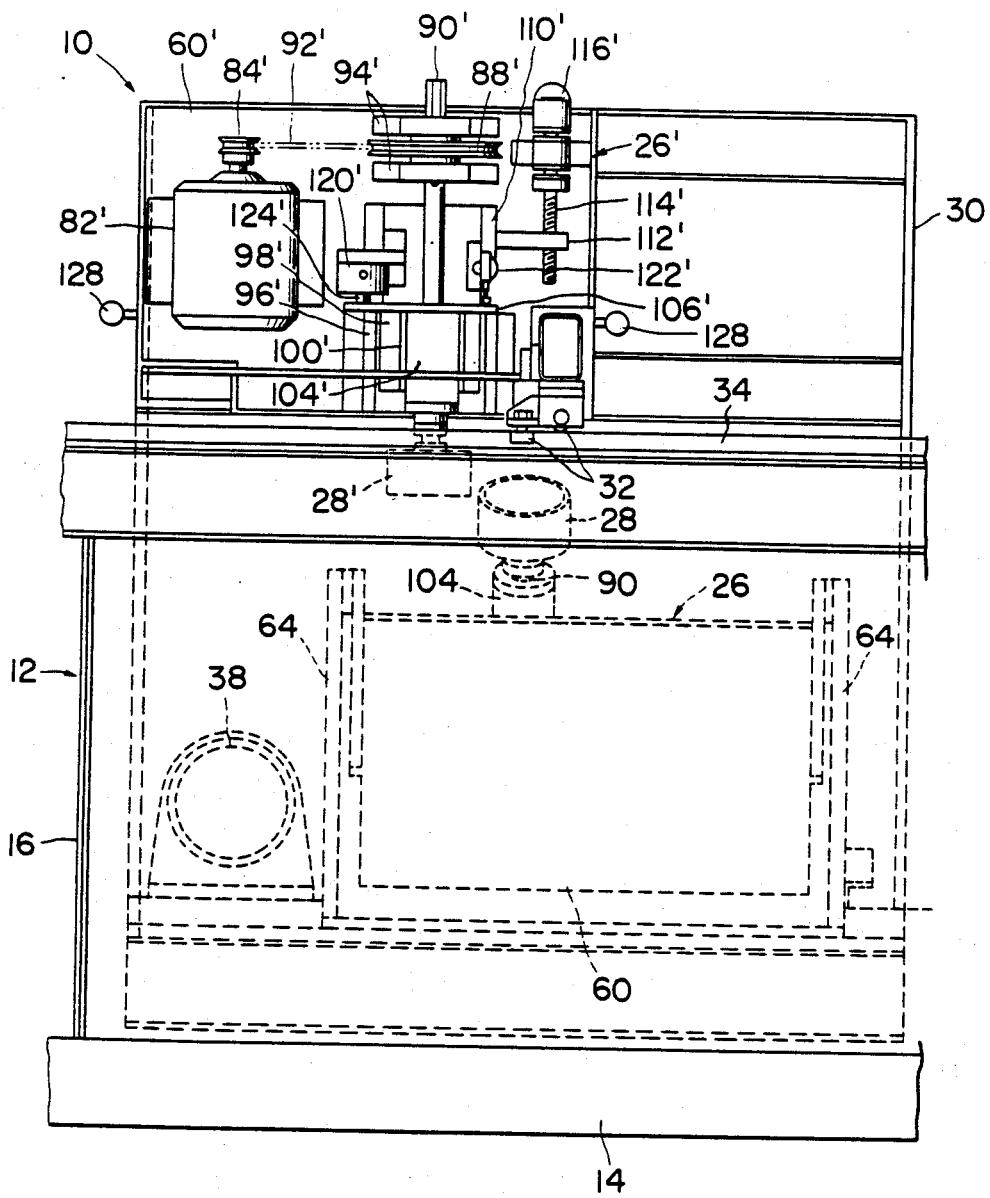
FIG. 2 is a rear elevation of the apparatus, seen from the left hand side of FIG. 1.
Figure 3:
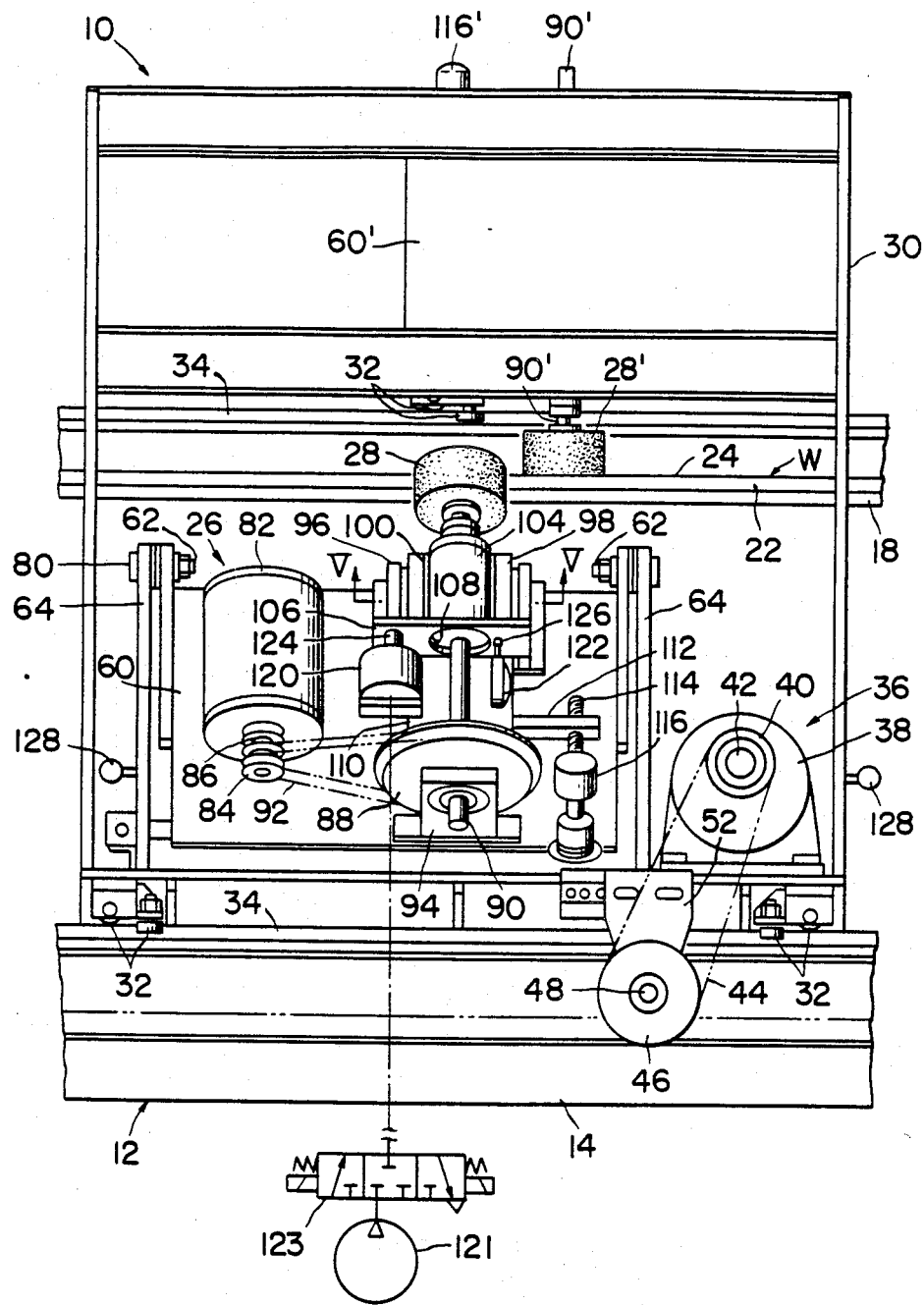
FIG. 3 is a front elevation of the apparatus, seen from the right hand side of FIG. 1.

Reference is first directed to FIGS. 1-3 showing the general construction of a preferred form of super-finishing apparatus in accordance with the invention as adapted for simultaneously grinding the opposite sides of a cutting tool. Generally designated 10, the representative apparatus has a framework 12 which is L-shaped as seen in a side view as in FIG. 1. The framework 12 comprises a bed 14 and a wall 16 erected on its back. Also erected on the bed 14 and disposed just forwardly of the wall 16 is a table 18 extending horizontally from side to side of the apparatus 10. The table 18 is shown to have mounted thereon the work W in the form of an elongate, straight-edged cutting knife extending longitudinally of the table. The cutting edge of the work W protrudes forwardly, or to the right as seen in FIG. 1, beyond the front edge of the table. A required number of clamps, one seen at 20 in FIG. 1, are arranged at longitudinal spacings on the table 18 for immovably holding the work W thereon.

It will also be noted from FIG. 1 that the work W has the sloping side 22 of its cutting edge oriented downwardly, and the nonsloping side 24 oriented upwardly. These opposite sides 22 and 24 of the work W are to be finish-ground by a pair of grinder units 26 and 26', respectively, of essentially like design. The lower grinder unit 26 has a superfine grinding wheel 28 movable into and out of endwise grinding contact with the sloping side 22 of the work W. The upper grinder unit 26' likewise has a superfine grinding wheel 28' movable into and out of endwise grinding contact with the nonsloping side 24 of the work W.

As will be better understood from FIGS. 2 and 3, the pair of grinder units 26 and 26' are both mounted on a common grinder carriage 30. On this grinder carriage the two grinder units 26 and 26' are offset from each other in the longitudinal direction of the work W in order that their grinding wheels 28 and 28' may not interfere with each other as they make grinding contact with the opposite sides of the work. The grinder carriage 30 is shown to have three sets of wheels or rollers 32 in rolling engagement with two guide rails 34 which are laid on the framework 12 and which both extend parallel to the longitudinal direction of the work W. Thus the grinder carriage 30 with the two grinder units 26 and 26' thereon in reciprocable longitudinally of the work W.

The grinder carriage 30 is self-propelled for rolling over the guide rails 34, having carriage drive mechanism 36, FIGS. 1 and 3, mounted thereon adjacent its bottom end. The carriage drive mechanism 36 comprises a reversible electric motor 38 (hereinafter referred to as the carriage drive motor) mounted fast on the grinder carriage 30. The carriage drive motor 38 has a drive pulley 40 rigidly mounted on its armature shaft 42. An endless belt 44 is wrapped around the drive pulley 40 and a driven pulley 46 of greater diameter fixedly mounted on one end of a shaft 48. This shaft 48 has its midportion rotatably journaled in a bearing 50 which is bracketed at 52 to the grinder carriage 30.

Figure 4:
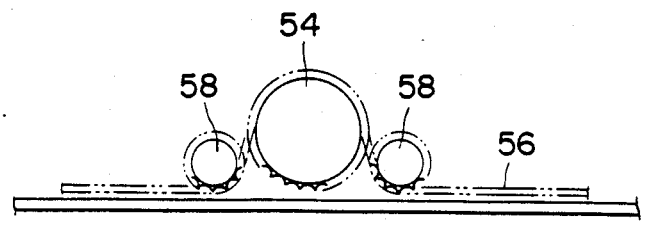
FIG. 4 is a somewhat enlarged, diagrammatic illustration of a chain-and-sprocket arrangement for driving the grinder carriage in the longitudinal direction of the work, the chain-and-sprocket arrangement being shown as seen in the direction of the arrows IV—IV in FIG. 1.

Rigidly mounted on the other end of the shaft 48 is a sprocket wheel 54 shown in FIG. 1 and on an enlarged scale in FIG. 4. The sprocket 54 is positively enaged with a length of chain 56 extending parallel to the work W and having its opposite extremities anchored to the bed 14 via tension springs, not shown. Preferably, and as shown in FIG. 4, a pair of guide sprocket wheels 58 of smaller diameter may be disposed on both sides of the first recited sprocket 54 for engagement with the chain 56, in order that the chain may engage the periphery of the sprocket 54 through a greater angle. With the sprocket 54 so engaged with the chain 56, the rotation of the sprocket will be translated into the linear rolling of the grinder carriage 30 over the guide rails 34 more efficiently and with less vibration. It is thus seen that the grinder carriage 30 is movable back and forth along the guide rails 34 with the bidirectional rotation of the carriage drive motor 38.

Although the two grinder units 26 and 26' are of substantially like configuration as aforesaid, the lower grinder unit 26 differs from the upper unit 26' primarily in that its angular position is adjustably variable about an axis parallel to the cutting edge of the work W. Such angular displacement of the lower grinder unit 26 enables the lower grinding wheel 28 to grind the sloping side 22 of the work W at various angles. The following is a description of how the lower grinder unit 26 is supported on the grinder carriage 30 for angular displacement, and of how the angular position of the lower grinder unit is adjustably varied.

With particular reference to FIGS. 1 and 3 the lower grinder unit 26 has its grinding wheel 28 and various other working components, to be set forth subsequently, mounted on a slanting baseplate 60 of generally rectangular shape. The baseplate 60 has a pair of trunnions 62, FIG. 3, protruding from its opposite sides in alignment with each other about an axis parallel to the cutting edge of the work W. The trunnions 62 are rotatably supported by a pair of upstanding support plates 64 fixedly mounted on a ledge 66, FIG. 1, of the grinder carriage 30. Thus the lower grinder unit 26, comprising the baseplate 60 and the various working components mounted thereon, is privotable on the grinder carriage 30 about the aligned axis of the trunnions 62.

At 68 in FIG. 1 is shown a mechanism for adjustably varying the angular position of the lower grinder unit 26 about the axis of the trunnions 62. The angle adjustment mechanism 68 comprises an arm 70 which is firmly anchored at one end to the lower grinder unit baseplate 60 and which extends with clearance through a slot 72 in one of the support plates 64. The other end of the arm 70 is threadedly engaged with a worm 74 rotatably supported by a pair of bearing lugs 76 on the grinder carriage 30. Also mounted on the grinder carriage 30, a reversible electric motor 78 (hereinafter referred to as the angle adjust motor) is coupled directly to the worm 74. Therefore, with the bidirectional rotation of the angle adjust motor 78 and hence of the worm 74, the lower grinder unit 26 is angularly displaceable back and forth about the axis of the trunnions 62.

FIG. 1 also shows at 80 an angle detector of conventional design acting between one of the trunnions 62 and one of the support plates 64 for detecting the angular position of the lower grinder unit 26 with respect to the work W. The angle detector 80 may take the form of an encoder, linear transducer or like known device capable of putting out an electric signal indicative of the angular position of the lower grinder unit 26.

FIG. 3 best illustrates the working components of the lower grinder unit 26 which are mounted on the pivotal baseplate 60. Such components include an electric motor 82 which serves to impart rotation to the grinding wheel 28 and which therefore will be called the wheel drive motor. The wheel drive motor 82 has a drive pulley 84 mounted fast on its armature shaft 86. A driven pulley 88 of much greater diameter is mounted on one end of a wheel drive shaft 90 for joint rotation therewith, on the other end of which is fixedly mounted the grinding wheel 28. An endless belt 92 extends over the drive pulley 84 and driven pulley 88 for transmitting the rotation of the wheel drive motor 82 to the wheel drive shaft 90. This wheel drive shaft is rotatably supported by a pair of bearings 94, one seen in FIG. 3, with the driven pulley 88 disposed between the bearings.

It is to be noted that the wheel drive shaft 90 is axially displaceable back and forth relative to the driven pulley 88 and bearings 94, even though this wheel drive shaft is nonrotatable relative to the driven pulley 88 and rotatable relative to the bearings 94. Such axial displacement of the wheel drive shaft 90 is necessary for pressing the grinding wheel 28 against the work W during grinding, as explained in detail hereafter.

Figure 5:
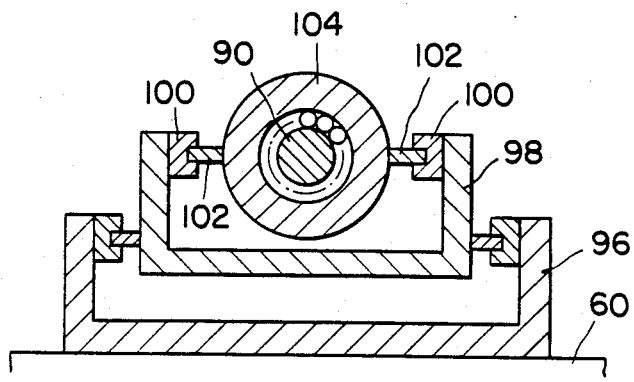
FIG. 5 is an enlarged section taken along the line of V—V in FIG. 3 and showing how the lower grinding wheel shaft is supported both for rotation and for axial displacement relative to the baseplate.

As illustrated on an enlarged scale in FIG. 5, a guide 96 of U-shaped cross section is immovably mounted on the baseplate 60, providing a linear guideway parallel to the wheel drive shaft 90. A first slide 98, also U-shaped in cross section, is slidably mounted to the guide 96. This first slide 98 is itself provided with a pair of opposed channel-shaped guides 100 extending parallel to the wheel drive shaft 90. Slidably engaged in the guides 100 are a pair of fins 102 formed substantially in one piece with a second slide 104 of tubular shape, so that this second slide is slidable relative to the first slide 98 in a direction parallel to the wheel drive shaft 90. The wheel drive shaft 90 concentrically extends through the tubular second slide 104 for rotation relative to the same but is constrained to joint axial displacement therewith. Therefore, the wheel drive shaft 90 is axially displaceable not only with both first and second slides 98 and 104 relative to the fixed guide 96 on the baseplate 60, but also with the second slide 104 relative to the first slide 98.

With reference back to FIG. 3 the second slide 104 has ridgily mounted to its rear end, away from the grinding wheel 28, an abutment 106 in the form of a rectangular plate extending in opposite lateral directions from the second slide in a plane at right angles with the axis of the wheel drive shaft 90. The abutment 106 is held against the rear end of the first slide 98. A clearance hole 108 in the abutment 106 permits the wheel drive shaft 90 to rotatably extends therethrough.

The first slide 98 has a rearward extension 110 with an arm 112 protruding laterally therefrom. The arm 112 makes threaded engagement with a feed worm 114 which is rotatably mounted on the baseplate 60 by a bearing, not seen in FIG. 3, and which is driven by an electric feed motor 116 mounted on the baseplate 60 in any convenient manner. A reference back to FIG. 1 will reveal that the feed motor 116 is coupled to the feed worm 114 via bevel gearing 118. The arm 112 and feed worm 114 constitute in combination a motion translating mechanism for converting the rotation of the feed motor 116 into the linear travel of the first slide 98 along the guide 96.

FIG. 3 further shows a fluid-actuated, preferably pneumatic, cylinder 120 and a dial indicator 122, both mounted fast on the extension 110 of the first slide 98. The air cylinder 120 has its piston rod 124 fixed endwise with the abutment 106 on the second slide 104, and the dial indicator 122 also has its spindle 126 held endwise against the abutment 106. The air cylinder 120 may be of either the double-acting, or the single-acting, spring-return type. Thus, as indicated by the graphic symbols in FIG. 3, at least the head end chamber of the air cylinder 120 communicates with an air pump 121 via a three-position, three-way, solenoid-actuated, normally closed, directional control valve 123. This valve may be solenoid actuated in either direction for selectively placing the air cylinder 120 in communication with the pump 121 or with a drain.

The dial indicator 122 is capable of visually indicating the relative displacement of the first and second slides 98 and 104. Further, preferably, the dial indicator 122 may be equipped with electrical contacts for presetting the depths of grinding by the grinding wheel 28. An encoder, linear transducer and other detectors may be substituted for the dial indicator 122.

Such being the construction of the lower grinder unit 26, the construction of the upper grinder unit 26' is self-evident from an inspection of FIGS. 1 and 2 taken together with FIG. 3. Therefore, in FIGS. 1 and 2, the various parts and components of the upper grinder unit 26' are identified by priming the reference numerals used to denote the corresponding parts and components of the lower grinder unit 26. As has been stated, the upper grinder unit 26' differs from the lower one 26 in that its baseplate 60' is rigidly mounted on the grinder carriage 30. Another difference is that the feed worm 114' of the upper grinder unit 26' is driven directly by the feed motor 116', instead of via the bevel gearing 118 as in the lower grinder unit 26. Any more detailed description of the upper grinder unit 26' would be merely redundant.

As indicated in FIGS. 2 and 3, a pair of end-of-travel sensors 128 are mounted in any convenient locations at both ends of the grinder carriage 30 for detecting the fact that the grinder carriage has reached the predetermined extremities of its travel along the guide rails 34. Such sensors may take the form of limit switches, photo-tubes, proximity switches, etc.

FIG. 1 shows at 130 a coolant pan for collecting the coolant which is to be flooded over the grinding wheels 28 and 28' and work W during grinding. Mounted on the bed 14 in underlying relation to the work W, the coolant pan 130 extends throughout the complete path of travel of the grinding wheels 28 and 28'.

Operation

In the use of the superfinishing apparatus 10 constructed as in the foregoing, the work W to be ground is mounted on the table 18, with its cutting edge protruding forwardly of the table and with its sloping side 22 oriented downwardly, as shown in FIG. 1. Then the work W is locked against displacement by the clamps 20.

Figure 6:
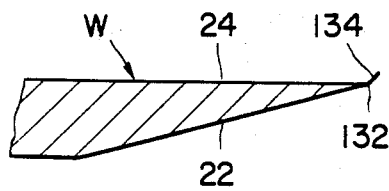
FIG. 6 is a fragmentary, cross-section through the work which has been rough-ground and which is yet to be finished.

FIG. 6 is a fragmentary illustration of the work W thus mounted on the table 18 for superfinishing. It is understood that this work has already been ground by a conventional knife grinder. Both sloping side 22 and non-sloping side 24 of the work W have still rough surfaces, and its cutting edge 132 has, in all likelihood, burrs 134 which may be bent toward the nonsloping side 24.

Figure 7:
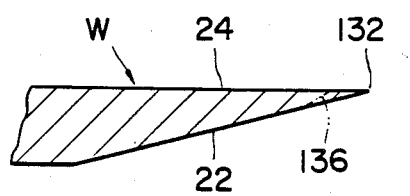
FIG. 7 is a view similar to FIG. 6 except that the work is shown after having been finished by the apparatus of this invention.

FIG. 7 is a similar illustration of the same work W that has been superfinished by the apparatus 10 in a manner hereinafter set forth. Both sloping side 22 and nonsloping side 24 of the superfinished work W are smooth-surfaced, defining a sharp, straight cutting edge 132 free from burrs. As desired or required, the work W may be double-tapered, as indicated by the phantom line designated 136, or even triple- or multiple-tapered, by the superfinishing apparatus 10 for the provision of a more durable cutting edge having its sloping side 22 substantially rounded as seen cross-sectionally. Such multiple-taper grinding of the work is possible by varying the angular position of the lower grinder unit 26 about the axis of the trunnions 62, as will be detailed subsequently.

Following the mounting and clamping of the work W on the table 18, the angular position of the lower grinder unit 26 may be adjusted as required for grinding the sloping side 22 of the work W at an optimum angle. Such adjustment will be accomplished simply as the angle adjust motor 78 is revolved in either direction.

Then the carriage drive motor 38 is set into rotation for moving the grinder carriage 30 over the guide rails 34 to an extent necessary for bringing the pair of grinding wheels 28 and 28' opposite the sloping side 22 and nonsloping side 24, respectively, of the work W. It is understood that the grinding wheels 28 are now held retracted away from the work W by the feed motors 116 and 116'.

Then, possibly with the carriage drive motor 38 set out of rotation, the air cylinders 120 and 120' is placed in communication with the pump 121 for fully extending their piston rods 124 and 124' by the delivery of pressurized air into their head end chambers. Such extension of the air cylinders 120 and 120' will result in the maximum relative displacement of the first slides 98 and 98' and the second slides 104 and 104' in the direction parallel to the wheel drive shafts 90 and 90'. The wheel drive motors 82 and 82' may now be set into motion for imparting rotation to the grinding wheels 28 and 28', which are still out of contact with the work W, via the endless belts 92 and 92' and wheel drive shafts 90 and 90'.

Then the feed motors 116 and 116' may be set into rotation revolving the feed worms 114 and 114'. Thereupon, being threadedly engaged with the feed worms 114 and 114' via the arms 112 and 112' on their rearward extensions 110 and 110', the first slides 98 and 98' together with the air cylinders 120 and 120' and dial indicators 122 and 122' thereon will travel along the guides 96 and 96' toward the work W. Such motion of the first slides 98 and 98' will be transmitted to the second slides 104 and 104', and thence to the wheel drive shafts 90 and 90' and the grinding wheels 28 and 28' thereon, as the fully extended piston rods 124 and 124' of the air cylinders 120 and 120' butt on the abutments 106 and 106' affixed to the second slides 104 and 104'.

Then, upon abutment of the cutting faces of the revolving grinding wheels 28 and 28' against the opposite slides 22 and 24 of the work W, the travel of the second slides 104 and 104' will be arrested, these being not axially displaceable relative to the wheel drive shafts 90 an 90'. The feed motors 116 and 116' may be maintained in rotation after the abutment of the revolving grinding wheels 28 and 28' with the work W. Such continued rotation of the feed motors 116 and 116' will cause only the first slides 98 and 98' to travel forwardly, with the consequent contraction of the air cylinders 120 and 120' as the air contained in their head end chambers become compressed.

The energy thus stored in the air cylinders 120 and 120' is utilized for forcing the grinding wheels 28 and 28' against the work W during the subsequent process of superfinishing. The feed motors 116 and 116' may be set out of rotation at a preset moment or when the dial indicators 122 and 122' give a predetermined reading. The amount of energy stored in the air cylinders 120 and 120' as above described must be sufficient to enable the grinding wheels 28 and 28' to superfinish the work W even in the face of undulations or other surface imperfections that may be present in the rough-ground work, and of the inevitable wear of the grinding wheels themselves during such super-finishing.

In the method of operation so far described, the grinding wheels 28 and 28' have been in rotation throughout the period of their contact with the work W. Therefore, as required or desired, the grinder carriage 30 may be driven at low speed during this period in order to prevent the grinding wheels 28 and 28' from removing too much stock from the same parts of the work W.

Alternatively, the grinding wheels 28 and 28' may be initially be held out of rotation and may be retracted away from the work following the setting of a prescribed amount of grinding energy. Then the grinding wheels 28 and 28' may be set into rotation before being moved into grinding contact with the work.

Now the apparatus 10 is ready for actual super-finishing operation. The carriage drive motor 38 may again be set into rotation for propelling the grinder carriage 30 along the guide rails 34. Driven by the carriage drive motor 38, the sprocket wheel 54 will revolve in positive engagement with the chain 56 which, by virtue of the pair of guide sprockets 58, is wrapped around the sprocket 54 through such a great angle as to preclude any possibility of slippage. The revolving grinding wheels 28 and 28' will concurrently grind the opposite sides 22 and 24 of the work W as they travel with the grinder carriage 30 in the longitudinal direction of the work.

Each time the grinder carriage 30 reaches either end of the work W, the rotational direction of the carriage drive motor 38 is automatically reversed in response to the output from either of the end-of-travel sensors 128. This output from either of the sensors 128 may also be used for temporarily draining the fluid from the head end chambers of the cylinders 120 and 120', thereby relieving the grinding wheels 28 and 28' of the forces that have been urging them against the work W. The head end chambers of the cylinders 120 and 120' may both be repressurized immediately when the grinder carriage 30 restarts traveling in the opposite direction. The overgrinding of the opposite longitudinal end portions of the work W can thus be prevented.

Such reciprocation of the grinder carriage 30 may be repeated a required number of times until the work W is superfinished as illustrated in FIG. 7. Of course, in cases where only the sloping side 22 of the work W is to be superfinished, only the lower grinder unit 26 may be operated as in the foregoing. The upper grinder unit 26' may be held out of operation, or may not be provided at all, for such use of the apparatus in accordance with the invention.

The provision of the upper grinder unit 26' is nevertheless preferable, however, as it can be used for ready removal of the burrs 134, FIG. 6, from the cutting edge 132 of the work W and for making the nonsloping side 24 of the work free of various possible surface imperfections that have been produced by the preceding rough grinding. Usually, the upper grinder unit 26' needs to grind the nonsloping side 24 of the work W to a much less depth than does the lower grinder unit 26 to grind the sloping side 22 of the work. If the lower grinder unit 26 must reciprocate 10 times for superfinishing the sloping side 22 of the work W, the upper grinder unit 26' will have to reciprocate seven times or so for grinding the nonsloping side 24 of the work to a satisfactory degree. In this case the upper grinder unit 26' may be set into operation after the lower grinder unit 26 has made three reciprocations, so that the grinding of both sides of the work will be completed simultaneously. If the work W is to be multiple tapered, the upper grinder unit 26' may be held retracted during the second and subsequent steps of angled grinding of the sloping side of the work by the lower grinder unit 26.

In some cases, the upper grinder unit 26' may also be made pivotable about an axis parallel to the longitudinal direction of the work W. Such pivotable upper grinder unit may be used for grinding off the cutting edge 132 of the work W to an extent necessary for the provision of a very durable cutting tool. In this case, too, the grinding of both sides of the work may be completed simultaneously.

Automatic and Semiautomatic Control Systems

The superfinishing apparatus 10 of the above described construction and operation is well calculated for automation. FIGS. 8–13 are block-diagrammatic illustrations of several possible automatic and semiautomatic control systems to be incorporated with the superfinishing apparatus 10. For the convenience of disclosure, all these illustrations are limited to the control of only the lower grinder unit 26 as used for multiple-taper grinding.

Figure 8:
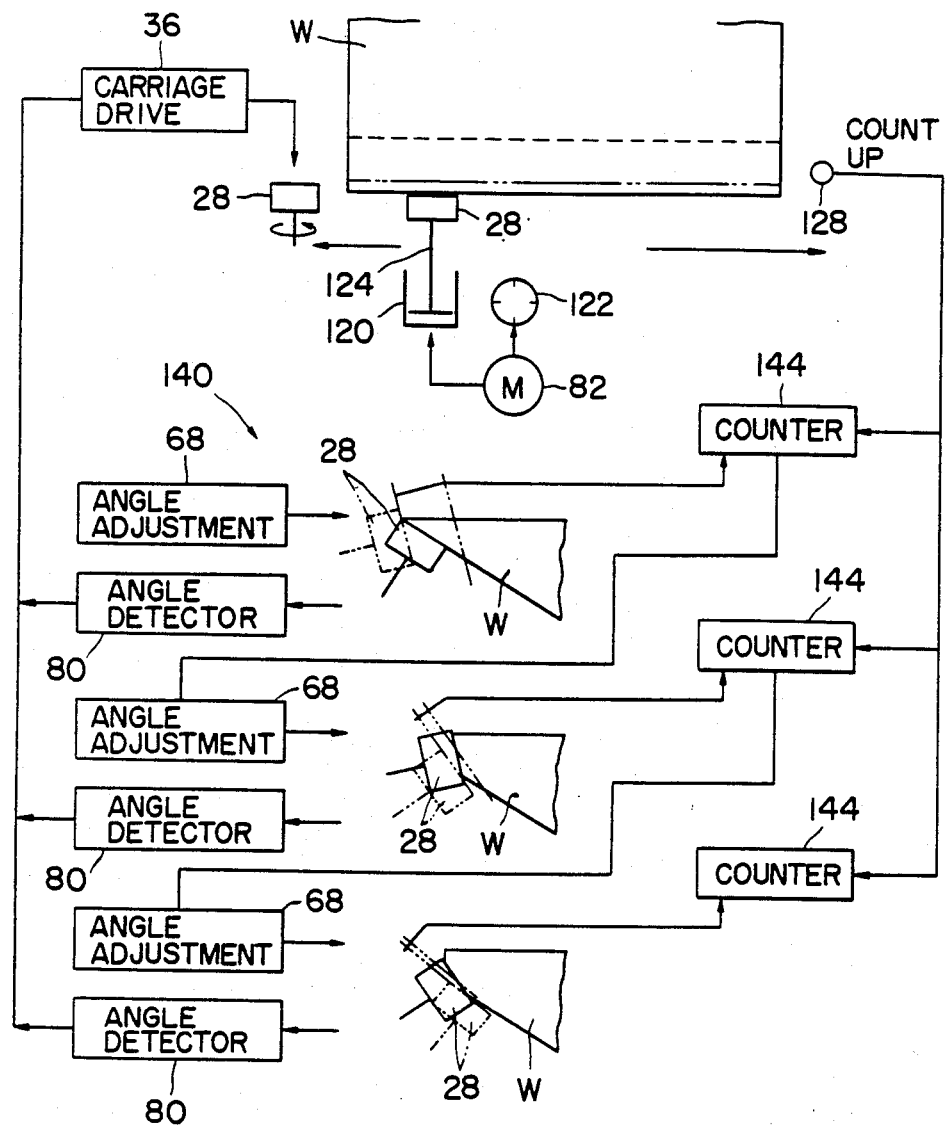
FIG. 8 is a block diagram exlanatory of how the work is automatically multiple-taper ground by the apparatus of FIG. 1, with the actual grinding depth detected by the counter counting the reciprocations of the grinder carriage.
Figure 9:
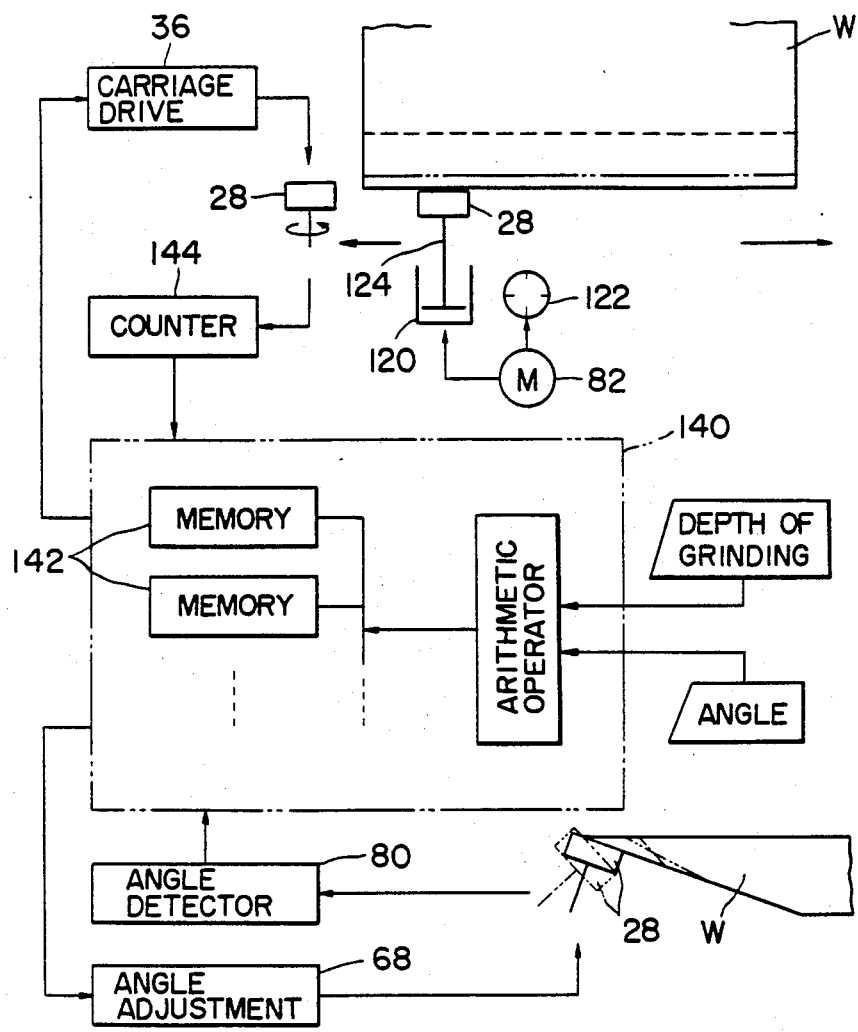
FIG. 9 is a block diagram explanatory of how the work is semiautomatically multiple-taper ground by the apparatus of FIG. 1, with the actual grinding depth also detected by counting the reciprocations of the grinder carriage.
Figure 10:
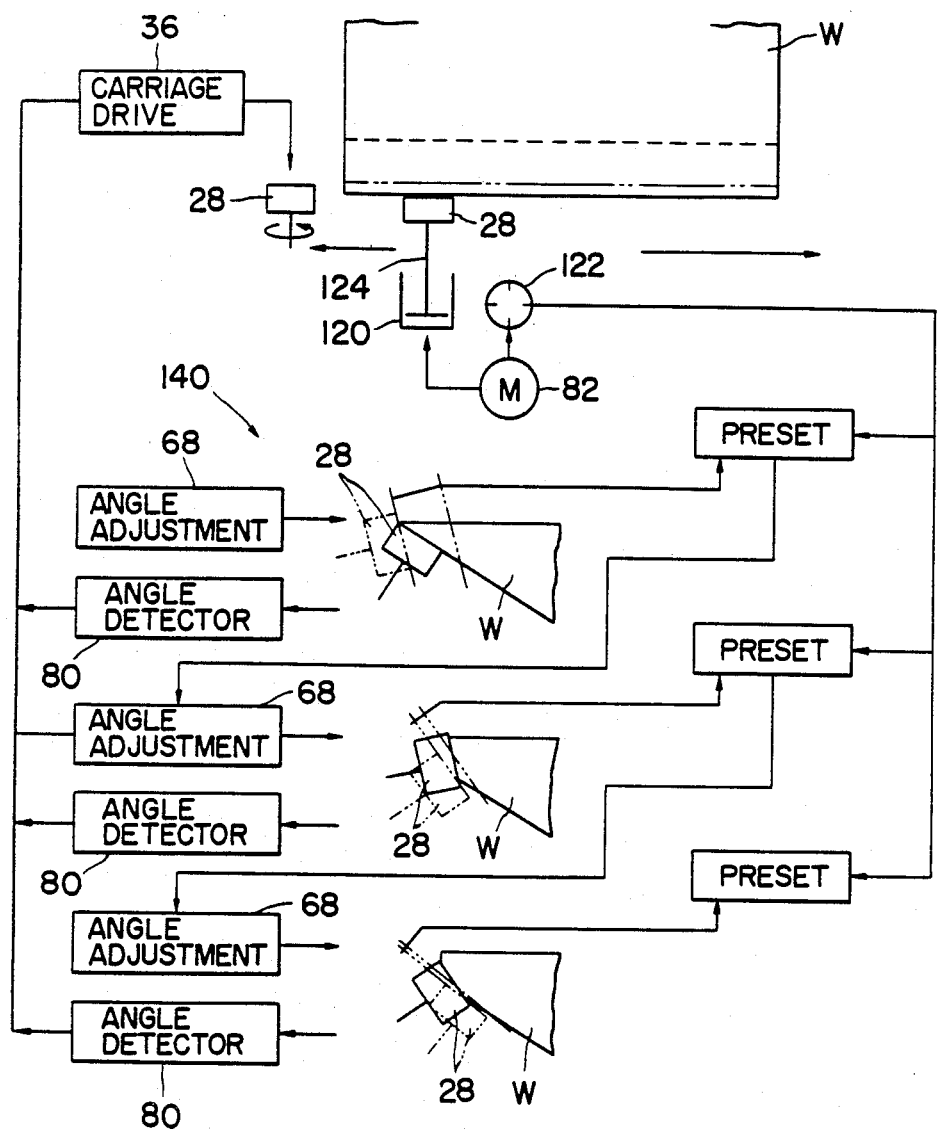
FIG. 10 is a block diagram explanatory of how the work is automatically multiple-taper ground by the apparatus of FIG. 1, with the actual grinding depth detected from the axial displacement of the grinding wheel toward the work.
Figure 11:
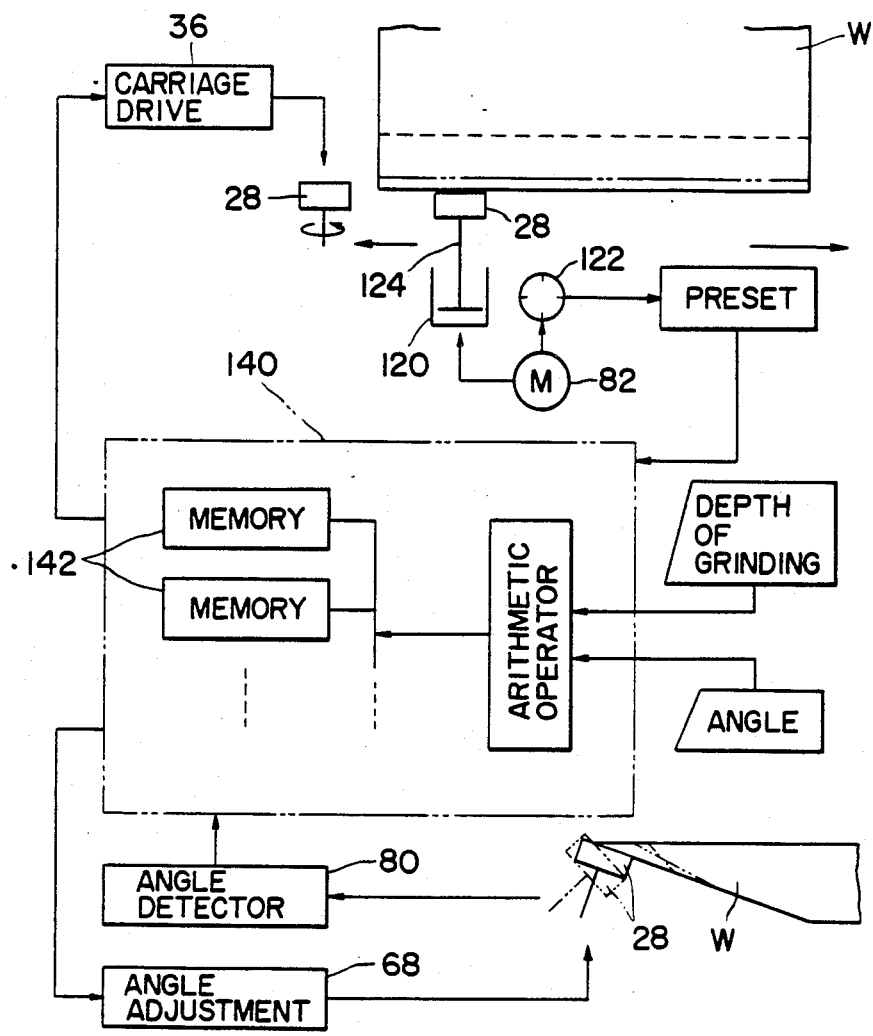
FIG. 11 is a block diagram explanatory of how the work is semiautomatically multiple-taper ground by the apparatus of FIG. 1, with the actual grinding depth detected from the axial displacement of the grinding wheel toward the work.
Figure 12:
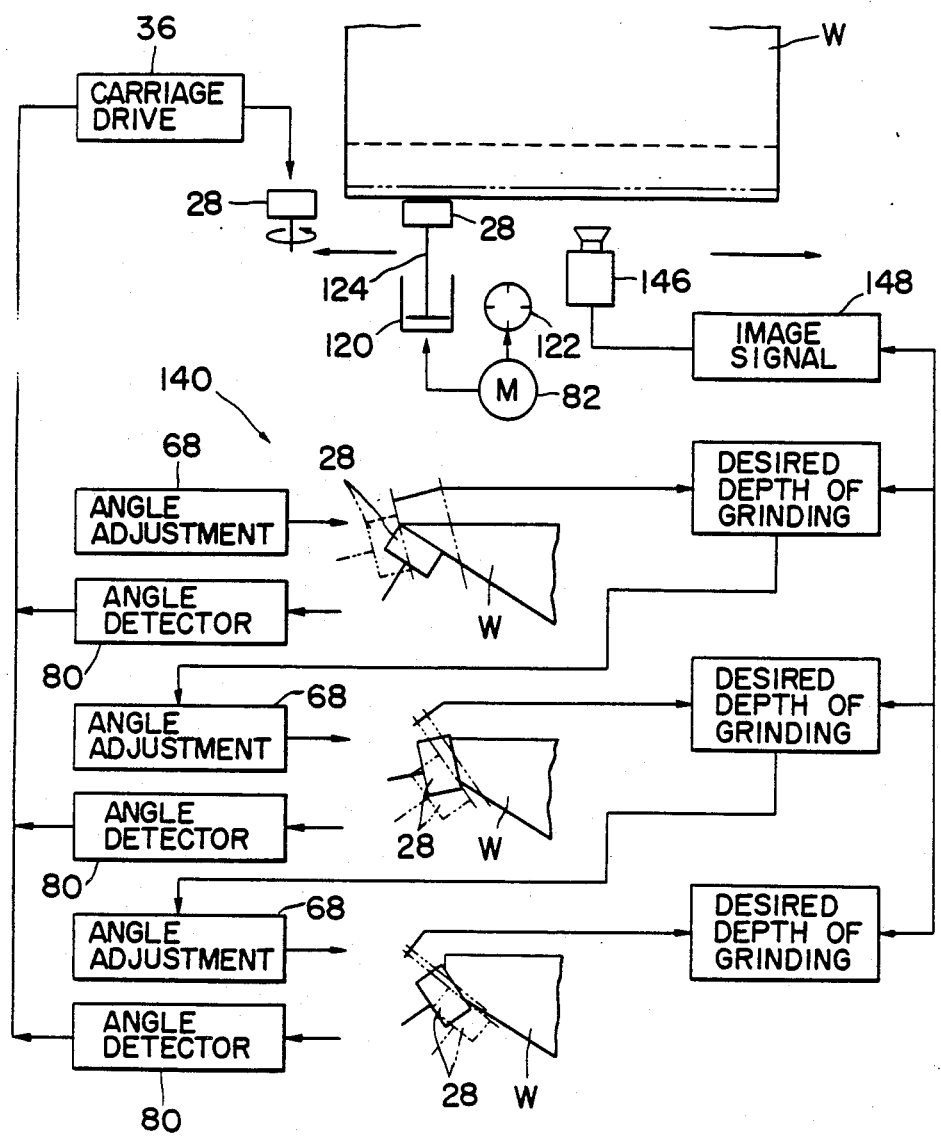
FIG. 12 is a block diagram explanatory of how the work is automatically multiple-taper ground by the apparatus of FIG. 1, with the actual grinding depth detected by shooting the work with the video sensor.
Figure 13:
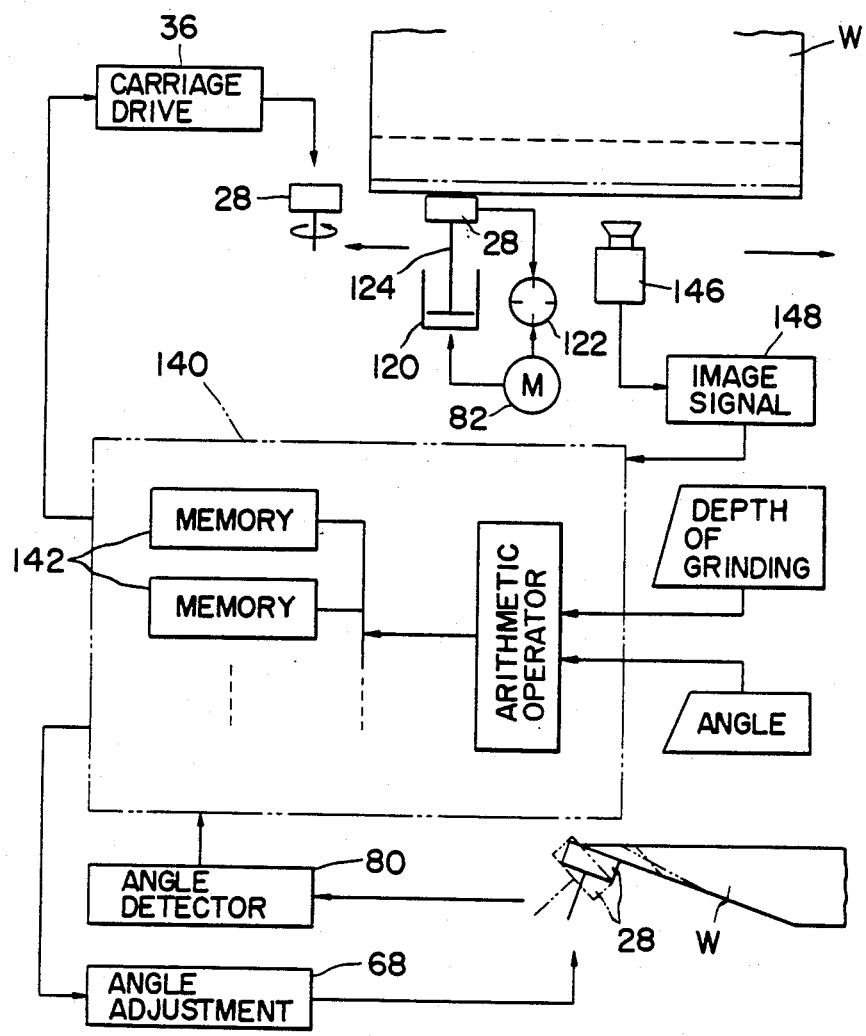
FIG. 13 is a block diagram explanatory of how the work is semiautomatically multiple-taper ground by the apparatus of FIG. 1, with the actual grinding depth detected by shooting the work with the video sensor.

FIGS. 8, 10 and 12 represent automatic control systems comprising electronic control circuitry 140 in which are stored, practically as a plurality of different superfinishing models, data representative of the angle and grinding depth of single-taper grinding, and of the angles and grinding depths of multiple-taper grinding. FIGS. 9, 11 and 13, on the other hand, represent semiautomatic control systems having memory means 142 for the storage of data representative of desired grinding angles and depths as such data are manually input preparatory to the commencement of each job.

All these automatic and semiautomatic control systems are classifiable into three groups according to the way in which the grinding depth is detected at each angle. In the FIGS. 8 and 9 systems the grinding depths are ascertained from the number of reciprocations of the grinder unit 26 in the longitudinal direction of the work W. To this end a counter 144 is electrically connected to one of the end-of-travel sensors 128 on the grinder carriage 30. In the FIGS. 10 and 11 systems the dial indicator 122 has electrical contacts in prescribed positions thereon for presetting the grinding depths, with the expected wear of the grinding wheel 28 taken into consideration. Grinding to the preset depths, being manifested by the relative displacement between the first and second slides 98 and 104 in the axial direction of the wheel drive shaft 90, is to be detected by proximity switches or the like. The FIGS. 12 and 13 systems employ a video sensor 146 for shooting the work W and for producing an image signal 148 indicative of the progress of grinding. Grinding to each preset depth is ascertained from this image signal.

It will also be noted from FIGS. 8-13 that the control circuitry 140 is electrically connected both to the angle adjustment 68 (or to its motor 78) and to the angle detector 80. Each time the angular position of the lower grinder unit 26 is varied with respect to the work W by the angle adjustment 68, this new angle is fed back to the control circuitry 140 from the angle detector 80. Then the grinder unit 26 starts grinding the work W through the above described procedure, traveling back and forth along the work.

The control circuitry 140 will temporarily set the grinder unit 26 out of operation when the work is ground to a desired depth. The fact that the work has been ground to the desired depth is determined in the FIGS. 8 and 9 systems when the counter 144 counts a prescribed number of input pulses representative of the reciprocations of the grinder unit 26, in the FIGS. 10 and 11 systems when the dial indicator 122 produces an electric signal indicative of the prescribed relative displacement between the first and second slides 98 and 104, and in the FIGS. 12 and 13 systems when the image signal 148 from the video sensor 146 represents a prescribed level. Then the control circuitry 140 will proceed to re-actuate the angle adjustment 68 for setting the grinding wheel 28 at the next angle required. Thereafter the same procedure will be repeated until the desired multiple-taper superfinishing is accomplished.

It is recommended that the control circuitry 140 be associated with a display system having either a set of analog display windows 150 of FIG. 14 or a set of digital display windows 150' of FIG. 15. Data to be displayed on these windows 150 or 150' are the angles of the grinding wheel 28, and the desired (preset) grinding depth, present depth that has been ground, and remaining depth to be ground, at each angle.

More specifically, in the case of the FIGS. 8 and 9 control systems, the display windows 150 or 150' may display the preset numbers of grinder unit reciprocations, the numbers of reciprocations practiced, and the remaining numbers of reciprocations, at the various angles of the grinding wheel 28, as illustrated in FIGS. 14 and 15. In the case of the FIGS. 10 and 11 control systems, the display windows 150 or 150' may display the preset, current, and remaining relative displacements between the first and second slides 98 and 104 at various grinding wheel angles. In the case of the FIGS. 12 and 13 control systems, the display windows 150 or 150' may display the preset, current, and remaining grinding depths at various grinding wheel angles.

The particular showings of FIGS. 14 and 5 indicate that the grinding wheel 28 is to be first set at an angle of 28 degrees and then at 25 degrees with respect to the plane of the horizon. The desired number of grinder unit reciprocations is 10 at the first angle and four at the second angle. Currently, the grinder unit has completed four reciprocations at the first angle, the remaining number of reciprocations being six.

Generally, in veneer- or plywood-manifacturing or other woodworking plants, cutting tools are resharpened at regular intervals, and their grinding angles and depths are customarily determined. Therefore, in most cases, the cutting tools can be automatically resharpened by the apparatus 10 by selecting one of the customary sets of grinding angles and depths that are built into the control circuitry 140. In some special instances, however, manual inputting of different grinding angles and depths may become necessary. The grinding depths at various angles of multiple-taper grinding normally differ. A typical grinding depth at the first step of multiple-taper grinding is normally from 5/100 to 8/100 millimeters. This range of grinding depths is equivalent to counts of seven to ten by the counter 144 in the FIG. 9 control system. In the FIG. 11 control system the desired grinding depth must be preset on the dial indicator 122 in consideration of the expected wear, empirically known to the specialists, of the grinding wheel 28. In the FIG. 13 system the desired grinding depths may be input to the control circuitry 140 for storage in a form capable of comparison with the image signal 148 to be produced by the video sensor 146.

All such data representative of the desired grinding angles and depths will be visually displayed on the windows 150 and 150', FIGS. 14 and 15, in approprite analog or digital form depending upon the way in which grinding depths are preset and detected.

Regardless of whether the required set of superfinishing data is put manually or selected from among the exemplary sets build into the control circuitry 140, the apparatus 10 will operate substantially as previously described for superfinishing the work W. Each time the grinding of the work W at one angle is completed, as indicated by the count of the counter 144 (FIGS. 8 and 9), by the output from the dial indicator 122 (FIGS. 10 and 11), or by the image signal 148 from the video sensor 146 (FIGS. 12 and 13), the grinding operation will be automatically suspended. Then the angle adjust motor 78 will be re-energized, either in accordance with the program of the control circuitry 140 or with the data manually input to its memory means 142, for setting the lower grinder unit 26 at the next grinding angle with respect to the work W.

The same procedure will be repeated thereafter until the desired multiple-taper grinding is completed. As has been set forth in connection with FIGS. 14 or 15, the operator or supervisor of the apparatus 10 will be visually informed of the progress of such multiple-taper grinding on the display windows 150 or 150'.

Figure 16:
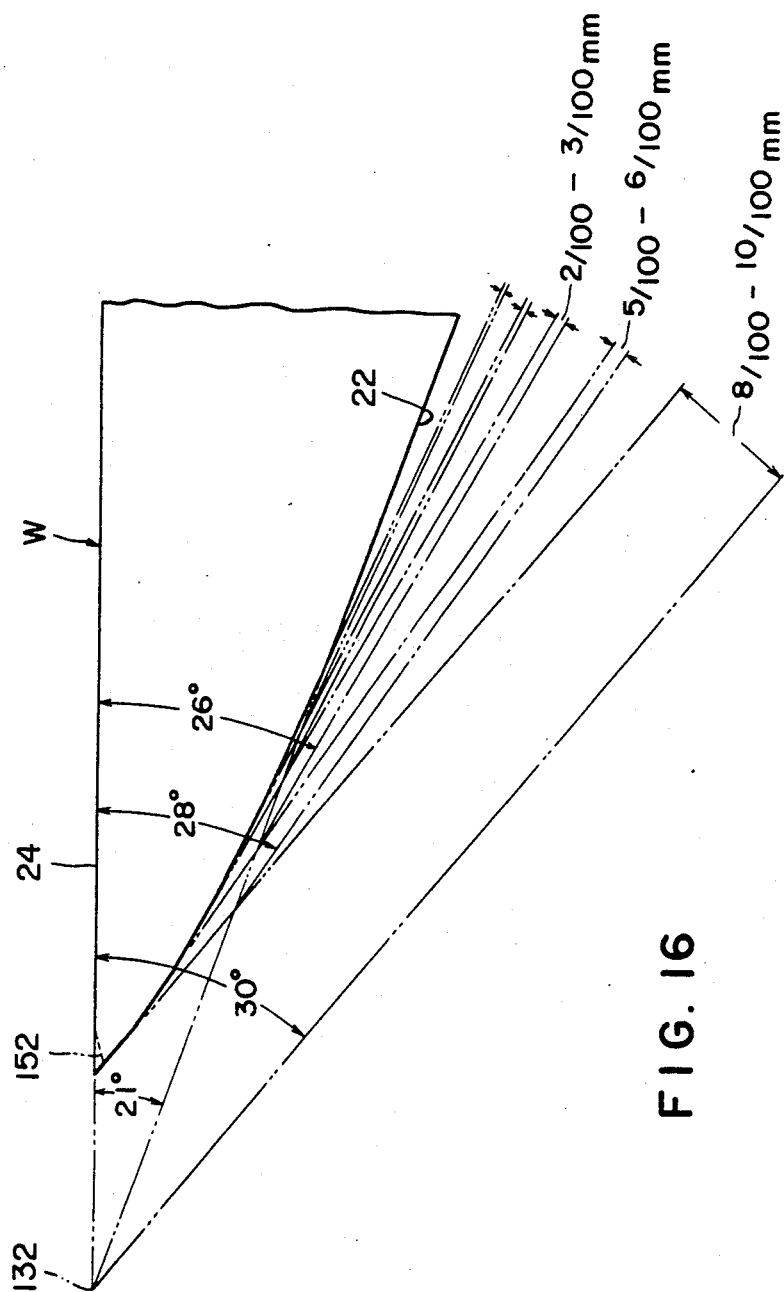
FIG. 16 schematically illustrates how the sloping side of the work is ground into a convex form for the provision of a more durable cutting edge in accordance with the invention.

It will now be apparent that the automatic control systems of FIGS. 8, 10 and 12 and the semiautomatic control systems of FIGS. 9, 11 and 13 lend themselves to use, as an extreme case of multiple-taper grinding taught in the foregoing, for convexing or rounding the sloping side 22 of the work W as drawn by the solid line in FIG. 16, thereby providing a cutting edge of more extended service life. The following is a discussion of how to multiple-taper grind the work W so as to provide the rounded sloping side 22 of FIG. 16.

Let us suppose that, as indicated by the phantom outline in FIG. 16, the cutting edge 132 of the work W as rough-ground by a separate grinder and mounted on the superfinishing apparatus 10 has an angle of, say, 21 degrees. The sloping side 22 of this work W may first be ground at a greater angle of, for example, 30 degrees, then at progressively smaller angles of, say, 28 degrees, 26 degrees, etc. The grinding depth at the first angle of 30 degrees should be the greatest, for example, from 8/100 to 10/100 millimters, and the grinding depths at the subsequent smaller angles should become progressively smaller. For example, the grinding depth at the second angle of 28 degrees may be from 5/100 to 6/100 millimeters, and that at the third angle of 26 degrees from 2/100 to 3/100 millimeters.

Figure 17:
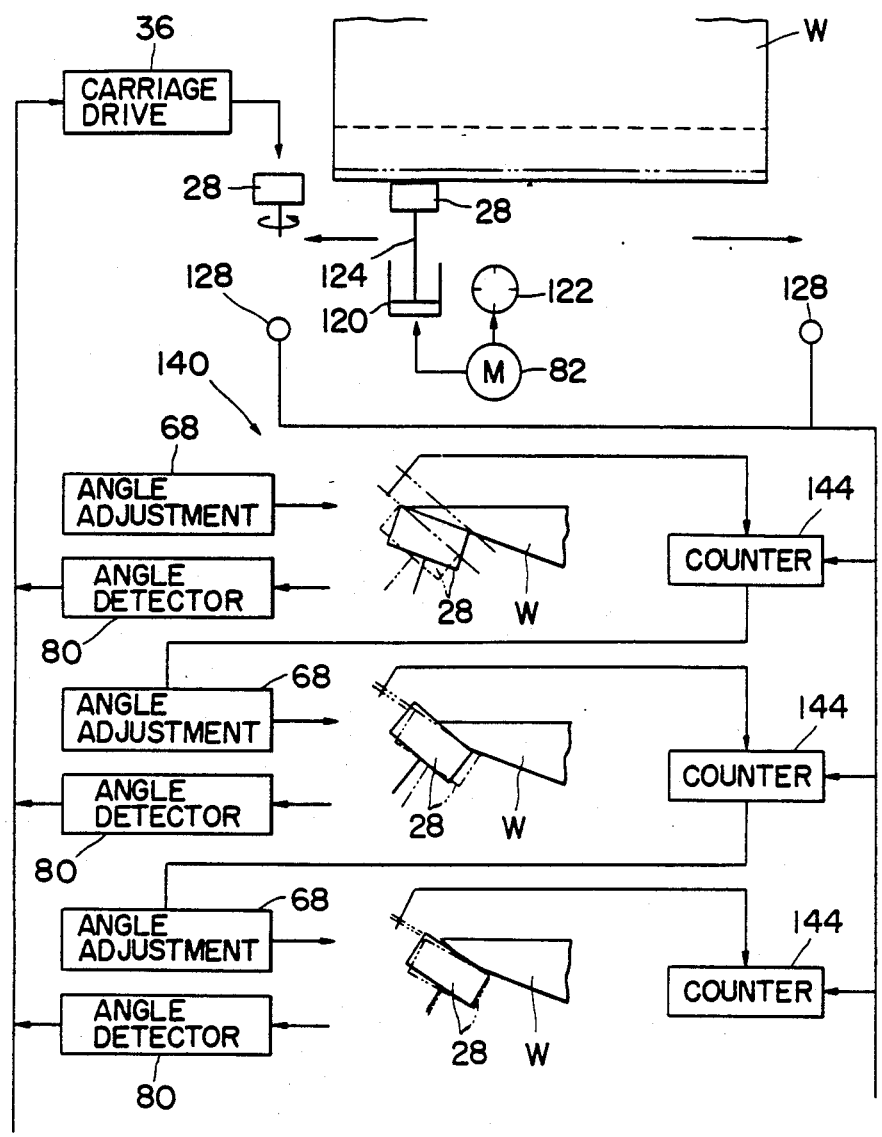
FIG. 17 is a block diagram explanatory of an automatic control system for grinding the sloping side of the work into a convex form as in FIG. 16 by the apparatus of FIG. 1.
Figure 18:
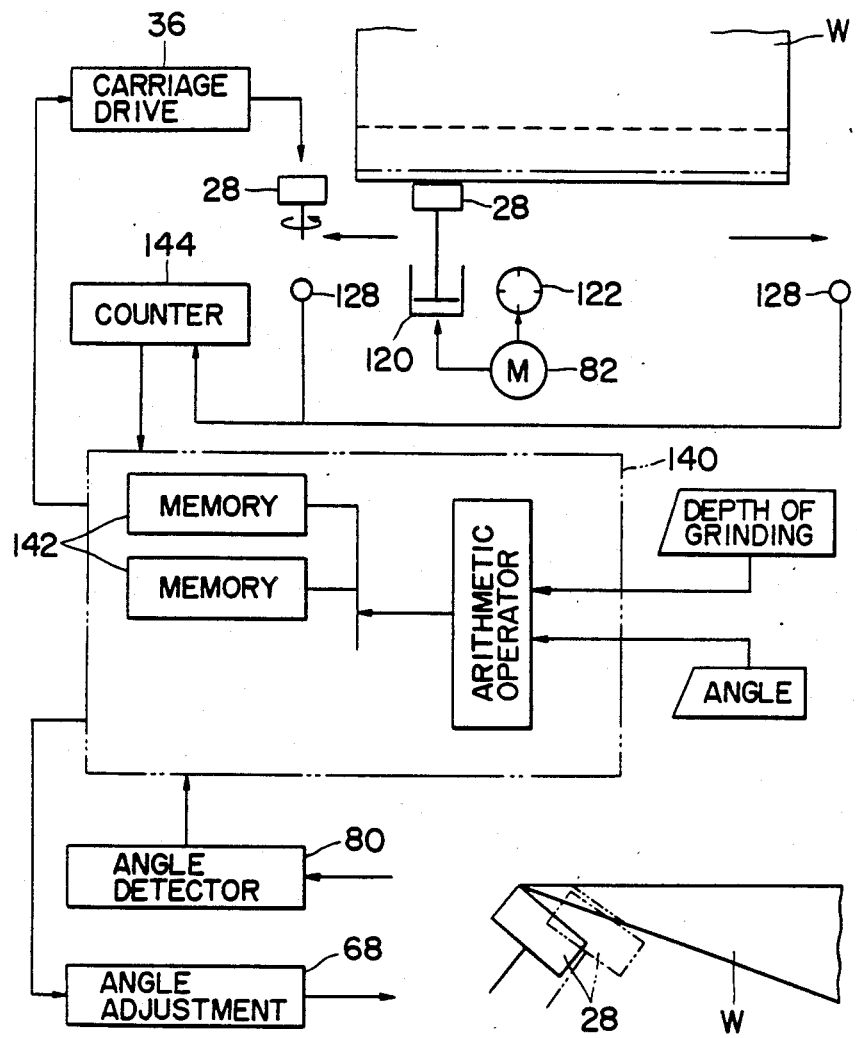
FIG. 18 is a block diagram explanatory of a semiautomatic control system for grinding the sloping side of the work into a convex form as in FIG. 16 by the apparatus of FIG. 1.

FIGS. 17 and 18 are explanatory of typical automatic and semiautomatic control systems, respectively, for use in carrying out the multiple-taper grinding of FIG. 16 in practice. These automatic and semiautomatic control systems are equivalent to those of FIGS. 8 and 9, respectively, in that the grinding depths are determined by the counter 144, except, however, that in the FIGS. 17 and 18 systems the counter is activated by the pair of end-of-travel sensors 128 at both ends of the grinder carriage 30 of FIGS. 1–3. Thus, in the FIGS. 17 and 18 systems, the counter 144 counts the strokes of the grinder carriage 30 in either direction along the guide rails 34, instead of counting the reciprocations of the grinder carriage as in the FIGS. 8 and 9 systems.

The above specified desired grinding depths at the various angles are equivalent, in this particular embodiment, to seven to 10 strokes at 30 degrees, four to five strokes at 28 degrees, and two to three strokes at 26 degrees. It must be heeded, however, that the work is not necessarily ground to the same depth with each stroke of the grinding wheel 28. For example, for grinding at the first angle of 30 degrees, the grinding wheel 28 is initially in contact only with the cutting edge 132 of the work W. Since the work W tapers to this cutting edge 132, the area of contact between the work and the grinding wheel 28 will gradually increase with the progress of grinding operation, so that the grinding wheel will grind the work W to a progressively less depth during each of the subsequent seven to 10 strokes.

All such data representative of the desired grinding angles and depths may either be previously introduced into the control circuitry 140 in the automatic control system of FIG. 17 or manually input in the memory means 142 preparatory to each job in the semiautomatic control system of FIG. 18.

The multiple-taper grinding operation itself for the provision of the rounded sloping side 22 of FIG. 16 can be performed just as previously described with reference to FIGS. 8–13. So ground, the initially planar sloping side 22, indicated by the phantom line in FIG. 16, of the work W will become convexed as shown by the solid line in the same figure. Of course, the greater the number of different grinding angles, the smoother curve will the sloping side 22 of the work W represent as seen cross-sectionally or in an end view as in FIG. 16.

FIG. 16 further shows that the nonsloping side 24 of the work W is ground off at 152 at an angle to its plane for the provision of a still more durable cutting edge. This angled grinding of the nonsloping side 24 necessitates the pivotal mounting of the upper grinder unit 26' in addition to that of the lower grinder unit 26. It is evident that the upper grinder unit 26' can be pivoted, and its angular position adjusted, by the same means as the lower grinder unit 26 is pivoted and has its angle adjusted with respect to the work.

Alternative Mechanical Constructions

Figure 19:
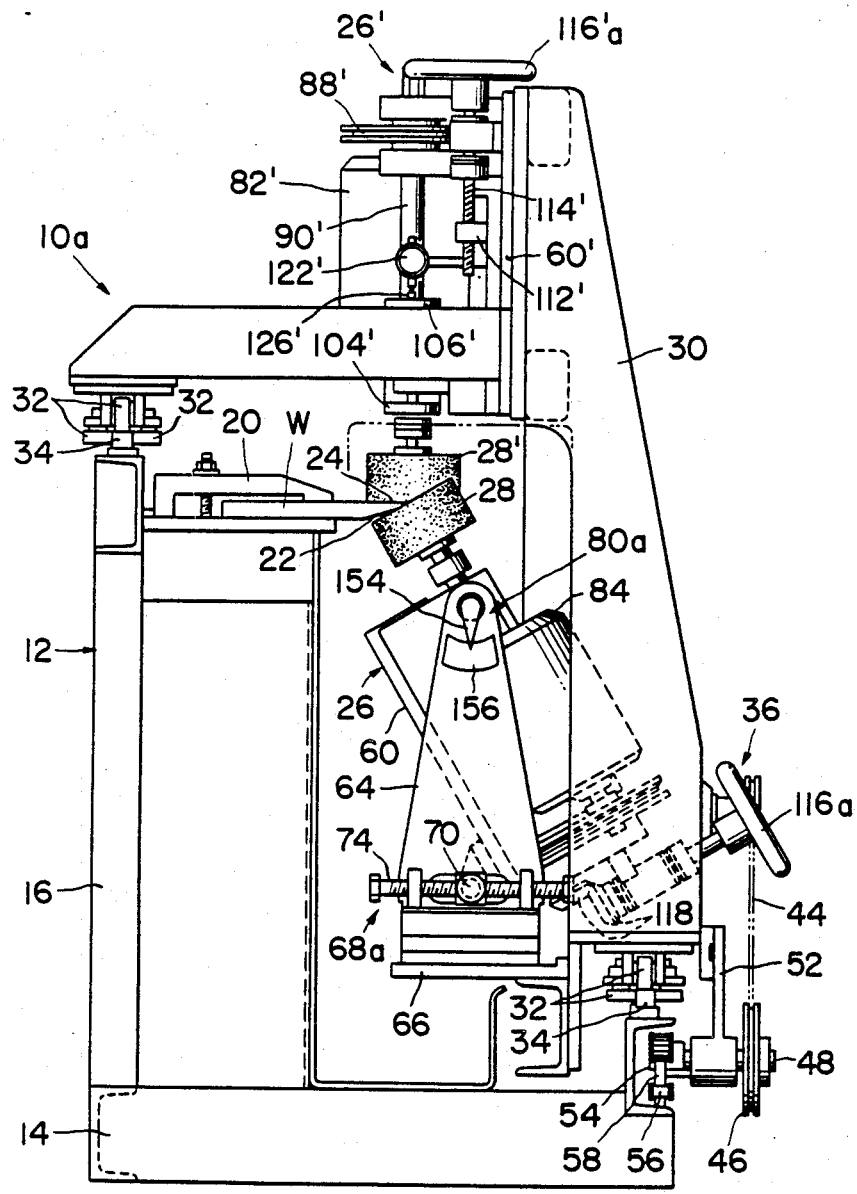
FIG. 19 is a view similar to FIG. 1 but showing an alternative form of the apparatus in accordance with the invention.

The automatic or semiautomatic control of the superfinishing apparatus is not an essential feature of this invention. Thus, in an alternative superfinishing apparatus 10a shown in FIG. 19, handwheels 116a and 116'a are employed in substitution for the electric feed motors 116 and 116' of the first disclosed apparatus 10. These handwheels may be turned manually for the storage of the required fluid energy for forcing the grinding wheels 28 and 28' against the work W.

The angle adjust motor 78 and angle detector 80 of the FIGS. 1–3 apparatus 10 are also absent from the alternative apparatus 10a. In the modified angle adjustment 68a of the apparatus 10a, the worm 74 is to be turned manually for varying the angular position of the lower grinder unit 26 with respect to the work W. The angle detector 80 of the apparatus 10 is replaced in this alternative apparatus 10a by an angle indicator 80a comprising a pointer 154 and a dial 156. Mounted on one of the trunnions 62, FIG. 3, of the lower grinder unit 26, the pointer 154 is pivotable therewith to visually indicate the angular position of the lower grinder unit on the dial 156 on one of the support plates 64.

Figure 20:
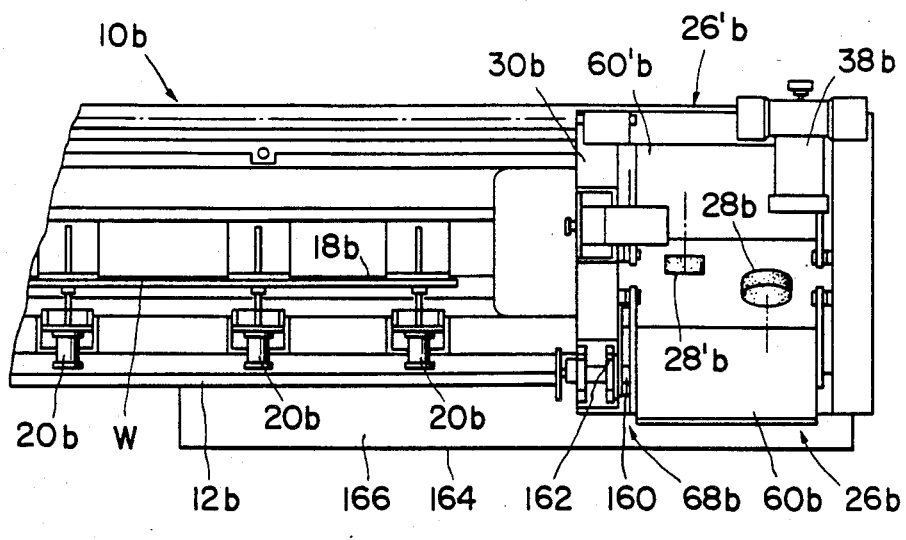
FIG. 20 is a fragmentary top plan of another alternative form of the apparatus in accordance with the invention.
Figure 21:
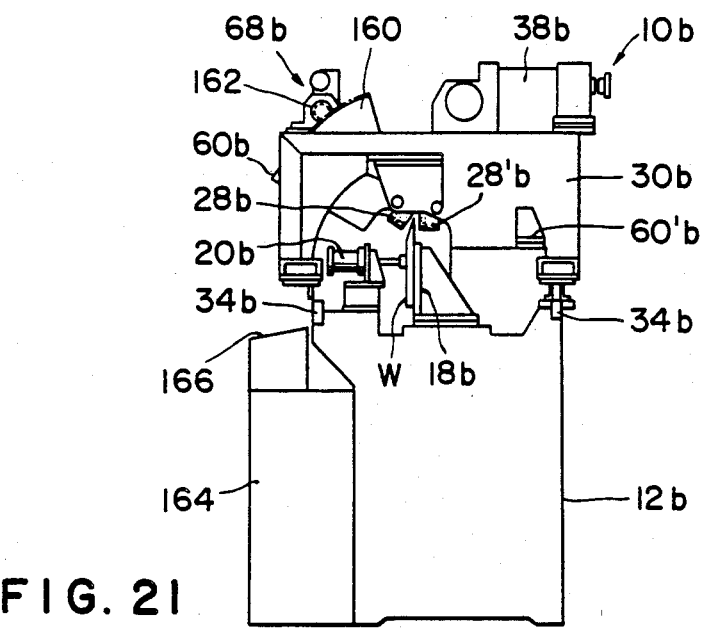
FIG. 21 is a right hand side elevation of the apparatus of FIG. 20.

In another alternative superfinishing apparatus 10b shown in FIGS. 20 and 21, the work W is mounted on a table 18b with its cutting edge oriented upwardly, instead of forwardly as in the apparatus 10 and 10a. The sloping side of the work W is oriented forwardly, that is, downwardly as seen in FIG. 20 and to the left as seen in FIG. 21. A series of fluid actuated cylinders 20b are arranged on a framework 12b at spacings in its longitudinal direction for immovably holding the work W against the table 10b.

Mounted on the framework 12b for rolling motion along a pair of guide rails 34b, a grinder carriage 30b is substantially in the shape of an inverted U as seen in a side view as in FIG. 21. The grinder carriage 30b has mounted thereon a front grinder unit 26b for grinding the sloping side of the work W and a rear grinder unit 26'b for grinding the nonsloping side of the work. Although FIG. 20 shows only the grinding wheels 28b and 28'b and baseplates 60b and 60'b of the front and rear grinder units for illustrative convenience, it will nevertheless be seen that the two grinding wheels are displaced from each other in the longitudinal direction of the work W in order to avoid mutual interference during grinding. The grinder carriage 30b has a carriage drive motor 38b mounted thereon and is thereby self-propelled for reciprocation in the longitudinal direction of the work.

The front grinder unit 26b is provided with an angle adjustment 68b for adjustably varying the angle of the front grinding wheel 28b with respect to the work W. The angle adjustments 68b of this alternative apparatus 10b comprises a sector gear 160 rigidly mounted to the baseplate 60b, and a pinion 162 rotatably mounted on the grinder carriage 30b for driving engagement with the sector gear 160. It will be apparent from the foregoing disclosure that the rear grinder unit 26'b could likewise be made pivotable about an axis parallel to the longitudinal direction of the work W.

Seen at 164 in FIGS. 20 and 21 is a control console in which are housed the various electrical and electronic controls, including the control circuitry 140 of FIGS. 8-13, 17 and 18, of the superfinishing apparatus. The control console 164 has a control panel 166 on which can be arranged the display windows 150 of FIG. 14 or the display windows 150' of FIG. 15.

Figure 22:
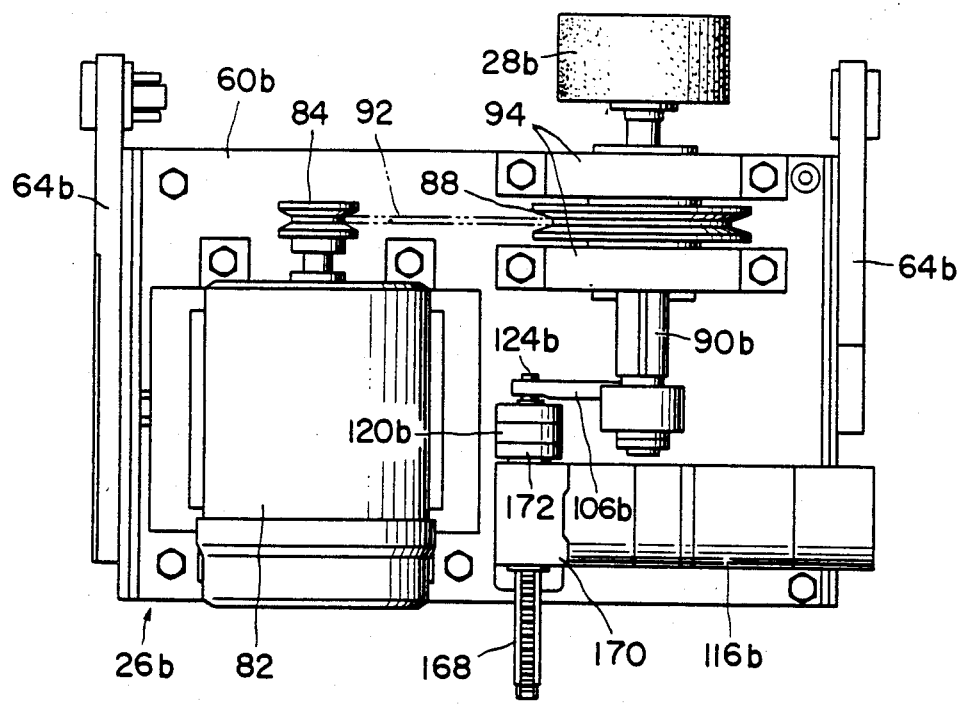
FIG. 22 is an enlarged top plan of one of the grinder units of the apparatus of FIG. 20.
Figure 23:
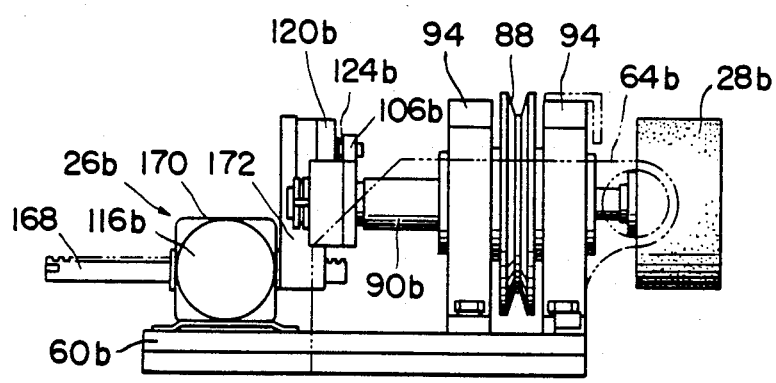
FIG. 23 is a right hand side elevation of the grinder unit of FIG. 22.

FIGS. 22 and 23 are enlarged elevations of the front grinder unit 26b, it being understood that the rear grinder 26'b can be of like construction. The front grinder unit 26b has its baseplate 64b on the grinder carriage 30b. Mounted on this pivotal baseplate 60b, a feed motor 116b is operatively coupled to a rack 168, extending parallel to a wheel drive shaft 90b, via a pinion assembly 170. This pinion assembly includes rack guide means, not shown, such that the rack 168 reciprocates longitudinally in response to the bidirectional rotation of the feed motor 116b. The rack 168 has a carrier arm 172 rigidly mounted thereto and extending right-angularly therefrom. A fluid actuated cylinder 120b, normally an air cylinder, has its head end mounted fast to the distal end of the carrier arm 172 and has its piston rod 124b oriented parallel to the wheel drive shaft 90b. The piston rod 124b is coupled to the wheel drive shaft 90b via another arm 106b.

As in the lower grinder unit 26 of the FIGS. 1-3 apparatus 10, the wheel drive shaft 90b is rotatably supported by the pair of bearings 94 on the baseplate 60b and is driven from the wheel drive motor 82 via the pulleys 84 and 88 and endless belt 92. The wheel drive shaft 90b is axially displaceable relative to the pulley 88 and bearings 94.

In the operation of the front grinder unit 26b of FIGS. 22 and 23, the rotation of the feed motor 116b in a preassigned direction results in the linear travel of the rack 168, and therefore of the grinding wheel 28b, toward the work W. The continued rotation of the feed motor 116b after the grinding wheel 28b has moved into abutment against the work W results in the contraction of the air cylinder 120b. The energy thus stored in the air cylinder 120b can be used for forcing the grinding wheel 28b against the work W during the subsequent process of superfinishing. The other details of construction and operation of the alternative apparatus 10b are considered self-evident from the foregoing description of FIGS. 1-18.

What is claimed is:

1. A method of grinding a straight edge of an elongate cutting tool to a fine finish, which method comprises:
    (a) providing a grinding wheel rotatably supported on slide means, said slide means being slidably mounted on a baseplate and a pneumatic cylinder having a piston rod extending therefrom toward said slide means being fixedly mounted behind said slide means on said baseplate;
    (b) advancing said baseplate toward said straight edge with said grinding wheel directed toward said edge, until the grinding wheel is pressed endwise against the straight edge and is prevented from further advance by the straight edge;
    (c) further advancing said baseplate to thereby cause said piston rod to abut against said slide means and to be displaced rearward into said cylinder for compressing air contained in the cylinder to generate pneumatic pressure in the cylinder to force the grinding wheel via said slide means against the straight edge for superfinishing said edge;
    (d) reciprocating the grinding wheel along a length of the straight edge between two ends of the length, rotating the grinding wheel, and forcing the grinding wheel against the straight edge under said pneumatic pressure until the straight edge is ground to a required depth as a result of the reciprocation; and
    (e) relieving the grinding wheel of the pneumatic pressure each time the grinding wheel reaches one of said two ends, until the grinding wheel restarts traveling toward the other of said ends.

2. The grinding method of claim 1 wherein the grinding wheel is rotated before being pressed against the straight edge.

3. A method of simultaneously grinding the opposite sides of a straight edge of an elongate cutting tool to a fine finish, which method comprises:
    (a) providing a pair of grinding wheels each being rotatably supported on slide means, said slide means being slidably mounted on a baseplate and a pneumatic cylinder having a piston rod extending therefrom toward said slide means being fixedly mounted behind said slide means on said baseplate, said grinding wheels being displaced from each other in the longitudinal direction of the straight edge and facing opposite sides of the straight edge, respectively;
    (b) advancing the baseplate of each grinding wheel toward an associated side of the straight edge each grinding wheel being directed toward said edge, until each grinding wheel is pressed endwise against the straight edge and is prevented from further advance by the straight edge;
    (c) further advancing the baseplate of each grinding wheel to thereby cause an associated piston rod to abut against an associated slide means and to be displaced rearward into an associated cylinder for compressing air contained in the cylinder to generate pneumatic pressure in the cylinder to force each grinding wheel via the associated slide means against the associated side of the straight edge for superfinishing said edge;
    (d) reciprocating each grinding wheel along a length of each side of the straight edge between two ends of the length, rotating each grinding wheel and forcing the grinding wheels against the straight edge under the pneumatic pressure, until each side of the straight edge is ground to a required depth as a result of the reciprocation; and
    (e) relieving each grinding wheel of the pneumatic pressure each time each grinding wheel reaches one of said two ends, until each grinding wheel restarts traveling toward the other of said ends.

4. The grinding method of claim 3 wherein each grinding wheel is rotated before being pressed against each side of the straight edge.

5. A method of fine-grinding an elongate cutting tool having a straight cutting edge defined by a sloping side and a nonsloping side with a first acute angle between the two sides, which method comprises:
   (a) providing a grinding wheel rotatably supported on slide means, said slide means being slidably mounted on a baseplate and a pneumatic cylinder having a piston rod extending therefrom toward said slide means being fixedly mounted behind said slide means;
   (b) advancing said baseplate toward said sloping side of the straight edge with said grinding wheel directed toward the sloping side, until the grinding wheel is pressed endwise against the sloping side at a second acute angle thereto and is prevented from further advance by the sloping side, said acute angle being greater than the first acute angle;
   (c) further advancing said base plate to thereby cause said piston rod to abut against said slide means and to be displaced rearward into said cylinder for compressing air contained in the cylinder to generate pneumatic pressure in the cylinder to force the grinding wheel via said slide means against said sloping side from superfinishing said edge;
   (d) reciprocating the grinding wheel along a length of the sloping side between two ends of the length, rotating the grinding wheel, and forcing the grinding wheel against the sloping side under said pneumatic pressure with said second acute angle being maintained until the sloping side is ground at the second acute angle to a predetermined depth as a result of the reciprocation;
   (e) grinding the sloping side by substantially repeating step (d) a prescribed number of times, the grinding wheel being held against the sloping side at such additional angles with respect to the nonsloping side thereof during said repeated steps that they become progressively smaller than the second acute angle, the sloping side being ground to a progressively smaller depth at each additional angle; and
   (f) relieving the grinding wheel of the pneumatic pressure each time the grinding wheel reaches one of said two ends, until the grinding wheel restarts traveling toward the other of said ends.

6. The grinding method of claim 5 which further comprises grinding the nonsloping side of the cutting edge at an angle thereto for providing a more durable cutting edge.

* * * * *